United States Patent [19]

Evans et al.

[11] Patent Number: 4,465,646

[45] Date of Patent: Aug. 14, 1984

[54] METHOD OF MAKING ELASTOMER-COATED HOT ROLL

[75] Inventors: Howard E. Evans; James C. Minor, both of Longmont, Colo.

[73] Assignee: International Business Machines Corporation, Armonk, N.Y.

[21] Appl. No.: 441,961

[22] Filed: Nov. 15, 1982

[51] Int. Cl.$^3$ .............................................. B29F 5/00
[52] U.S. Cl. .............................. 264/24; 264/DIG. 58
[58] Field of Search ............ 264/24, 63, 162, DIG. 58

[56] References Cited

U.S. PATENT DOCUMENTS

| | | | |
|---|---|---|---|
| 3,634,559 | 1/1972 | Haes et al. | 264/24 |
| 3,732,617 | 5/1973 | Rowe et al. | 264/24 |
| 3,989,777 | 11/1976 | Strawson et al. | 264/24 |
| 4,013,871 | 3/1977 | Namiki et al. | 219/471 |
| 4,074,001 | 2/1978 | Imai et al. | 428/329 |
| 4,264,181 | 4/1981 | Lentz et al. | 355/3 FU |
| 4,272,179 | 6/1981 | Seanor | 355/3 FU |
| 4,374,795 | 2/1983 | Keilp et al. | 264/DIG. 58 |

FOREIGN PATENT DOCUMENTS 61096 6/1978 Japan .

Primary Examiner—Donald E. Czaja
Assistant Examiner—W. Thompson
Attorney, Agent, or Firm—Francis A. Sirr

[57] ABSTRACT

A hot roll, for use in a xerographic, dry-release, hot roll fuser, is made by a method which adds iron-containing, magnetically permeable, particles to the elastomer as the elastomer is mixed. The particles may be pre-coated with a silane adhesive promoter. The mixed elastomer is then injected around a hollow, cylindrical aluminum core. As the elastomer sets up, in the mold, a magnetic field is applied such that the iron-containing particles migrate toward the metal core, and away from the exterior surface of the elastomer. This exterior surface will later be used to fuse xerographic toner. After the elastomer has set, its external surface is ground slightly, to produce a true circular-cylinder, but without exposing the underlying, more dense, layers of iron particle filler. As a result, the elastomer-to-core interface is mechanically strong, and yet the fusing property of the elastomer is not degraded by the presence of filler.

7 Claims, No Drawings

METHOD OF MAKING ELASTOMER-COATED HOT ROLL

DESCRIPTION

1. Technical Field

The present invention relates to the field of xerography, and to the fusing of toner by means of a dry-release, hot roll fuser.

2. Background of the Invention

The advent of high-copy-speed xerographic reproduction devices has led to almost exclusive use of the hot roll fuser as the means by which the toner image is fused to paper, to thereby form a finished copy. Two types of hot roll fusers have found their way into commercial use. They are of the wet-release, and the dry-release type. In a wet-release fuser, oil is supplied to the fusing nip, to prevent adhesion of toner to the hot roll. In the dry-release technology, the roll is not supplied with oil, and the roll's surface must be critically formed in order to prevent toner adhesion.

It is well known in the art of hot roll fusing that filler material can be added to increase the mechanical strength and/or thermal properties of the roll's elastomeric sleeve, and these fillers have included metals. U.S. Pat. No. 4,074,001; 4,264,181 and 4,272,179 are exemplary.

It is also known that the presence of filler material at the sleeve's outer fusing surface can be detrimental to release of the toner from the sleeve, as the copy sheet exits the fusing nip. This is sometimes called toner offset. In U.S. Pat. No. 4,013,871, the hot roll includes two separate rubber layers. The inner layer includes fillers which contribute mechanical strength. The outer layer is a silicone resin, to preclude toner offset.

THE INVENTION

The present invention utilizes magnetically permeable filler material or particles. These particles may be treated with a silane adhesion promoter. This treated or untreated filler material is uniformly mixed or dispersed into a liquid silicone elastomer, preferably one which does not contain other filler materials. This elastomer is preferably a rapid-curing vinyl polymer.

An exemplary brand of elastomer, without limitation thereto, is SYLGARD 182, an unfilled silicone elastomer by Dow Corning Corporation.

An exemplary filler particle, without limitation thereto, is ½ micron size $FE_3O_4$, MAGNETITE RB-BL, by Chiton Kogyo K.K.

The prior art, of which the aforementioned patents are exemplary, teaches filler-to-elastomer proportion ranges, and these ranges are usable in the present invention. Specifically, about 30% by weight of filler is suggested for the present invention.

In accordance with state-of-the-art practice, the elastomer/particle mixture is injected into a mold which contains an end-supported, hollow, circular-cylinder, aluminum core, i.e. pipe-shaped.

In accordance with the present invention, a strong magnetic field is applied to the now-filled mold. This magnetic field is created by an electromagnet which resides within the hollow core, while the core is in the mold. As a result, the filler particles migrate toward the surface of the aluminum core, creating a filler-density-gradient which increases as the core is approached, and decreases as the elastomer's outer surface is approached. Thus, the elastomer sleeve is resin-enriched at its fusing surface, and is filler-enriched at its attachment interface to the aluminum core.

The magnetic field which is applied to the uncured elastomer must be strong enough (i.e., magnetic flux density integrated over a period of time) to move the particles through the uncured elastomer, such that a particle-gradient results through the depth of the elastomer. That is, the roll's fusing interface must be substantially devoid of filler particles, but filler particles must exist in the underlying elastomer surface, and the density of filler particles must increase as the aluminum core is approached. On the other hand, the magnetic field should not be so strong that only the interface between the core and the elastomer contains filler particles. This latter case does not provide an elastomer having sufficient strength through the bulk of the elastomer.

The actual magnetic field strength to be used in a given application of the present invention is a function of factors such as particle size, elastomer viscosity, and the outer diameter of the aluminum core, as related to the configuration of the source of magnetic flux.

The present invention provides the best of both worlds. Namely, the elastomer is mechanically strong at its core-attachment-interface, and its fusing interface is substantially free of filler material which might produce toner offset.

In the event that the aforesaid mold is of accurate dimension, the molded hot roll may be ready for use after removal from the mold.

Usually, however, it is desirable to grind the outer surface of the elastomeric sleeve, in order to produce a true circular-cylinder. The degree of grinding should not, however, expose filler particles to the roll's fusing interface.

The particles may be treated with an adhesion promoter, prior to mixing with the elastomer, as aforesaid, to enhance the particle's function of reinforcing the elastomer. A typical adhesion promoter is of the class

$$(RO)_n—Si—(OR')_{4-n}$$

or

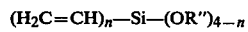

$$(H_2C=CH)_n—Si—(OR'')_{4-n}$$

where R, R' or R" may or may not be identical. The method of mixing the particles and the adhesion promoter is not critical.

A condensation reaction with the particles's hydroxyl functions, and the hydroxyl or alkoxy functions of the adhesion promoter, bonds the promoter to the particles. The particle then reinforces the elastomer by way of a reaction between the particle's hydroxyl or vinyl functions, and the hydride or vinyl functions of the elastomer.

While the present invention is not to be limited thereto, the present invention has special utility in the art of dry-release hot roll fusing, i.e., those fusers which do not rely on an oil wick to coat the roll's fusing surface with a release-enhancing oil.

While the invention has been particularly shown and described with reference to preferred embodiments thereof, it will be understood by those skilled in the art that various changes in form and details may be made therein without departing from the spirit and scope of the invention.

What is claimed is:

1. In a method for molding a cylindrical elastomeric sleeve about a cylindrical, nonmagnetic metal core in order to produce a hot roll for use in a xerographic hot roll fuser, the improvement comprising:
   mixing magnetic filler particles with an elastomer;
   providing a cylindrical, nonmagnetic metal core;
   molding said filled elastomer as a cylindrical fusing sleeve about said core; and
   applying a magnetic field to said elastomer as it sets, said field being of a strength to produce a density gradient of filler particles throughout said sleeve, said density being substantially zero at the exterior surface of said sleeve, said density increasing as said core is approached.

2. The method of claim 1 wherein said elastomer is a liquid silicone elastomer, and including the step of treating said filler particles with a silane adhesion promoter prior to mixing with said elastomer.

3. The method of claim 1 wherein said elastomer is a rapid-curing vinyl polymer, said particles are iron-containing particles, and said particles are treated with an adhesion promoter which includes hydroxyl or alkoxy functions, prior to the particles being mixed with said elastomer.

4. The method of claim 2 wherein said core is hollow, and said magnetic field is provided by a magnet which is placed within said hollow core.

5. The method of claim 4 including the step of grinding the elastomeric sleeve's outer surface to a circular-cylinder after the elastomer has set.

6. The method of claim 3 wherein said core is hollow, and said magnetic field is provided by an electromagnet which is placed within said hollow core.

7. The method of claim 6 including the step of grinding the elastomeric sleeve's outer surface to a circular-cylinder after the elastomer has set.

* * * * *